US007453900B2

(12) United States Patent
Robinson et al.

(10) Patent No.: US 7,453,900 B2
(45) Date of Patent: Nov. 18, 2008

(54) SYSTEM AND METHOD FOR MONITORING NOISE ASSOCIATED WITH A COMMUNICATION LINK

(75) Inventors: Walter L. Robinson, Raleigh, NC (US); Peter D. Beal, Apex, NC (US); Dennis N. Blankenship, Holly Springs, NC (US); Sumita Bose, Cary, NC (US); Bohdan Matuszczak, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 1353 days.

(21) Appl. No.: 10/382,711

(22) Filed: Mar. 5, 2003

(65) Prior Publication Data

US 2004/0193964 A1    Sep. 30, 2004

(51) Int. Cl.
H04L 12/28 (2006.01)
(52) U.S. Cl. .................................................... 370/431
(58) Field of Classification Search ........................ None
See application file for complete search history.

(56) References Cited

U.S. PATENT DOCUMENTS

| | | | | |
|---|---|---|---|---|
| 5,828,583 A | 10/1998 | Bush et al. | ............. | 364/551.01 |
| 6,032,019 A | 2/2000 | Chen et al. | ................... | 455/5.1 |
| 6,122,257 A | 9/2000 | Machida et al. | ............. | 370/252 |
| 6,137,824 A | 10/2000 | Liu | ............................. | 375/130 |
| 6,526,139 B1 | 2/2003 | Rousell et al. | ......... | 379/406.08 |
| 6,526,140 B1 | 2/2003 | Marchok et al. | ....... | 379/406.03 |
| 7,082,463 B1 * | 7/2006 | Bradley et al. | ............. | 709/223 |
| 2003/0032445 A1 | 2/2003 | Suwa | ......................... | 455/552 |
| 2003/0053475 A1 * | 3/2003 | Veeraraghavan et al. | .... | 370/431 |
| 2003/0120935 A1 * | 6/2003 | Teal et al. | .................. | 713/188 |
| 2006/0233548 A1 * | 10/2006 | Shivnan | ....................... | 398/33 |
| 2007/0041316 A1 * | 2/2007 | Chaudhuri | .................. | 370/218 |
| 2007/0060186 A1 * | 3/2007 | Ganesan et al. | ............. | 455/522 |
| 2007/0234426 A1 * | 10/2007 | Khanolkar et al. | ............ | 726/23 |

FOREIGN PATENT DOCUMENTS

| | | |
|---|---|---|
| EP | 0 920 150 A2 | 11/1998 |
| WO | WO 01/63825 | 8/2001 |

OTHER PUBLICATIONS

NN970363, Design for a Simple Network Management Protocol Subagent for Internet Firewalls, IBM Technical Disclosure Bulletin, vol. 40, Issue 3, Mar. 1, 1997, pp. 63-68.*

* cited by examiner

*Primary Examiner*—Firmin Backer
*Assistant Examiner*—Phuongchau B Nguyen
(74) *Attorney, Agent, or Firm*—Baker Botts L.L.P.

(57) ABSTRACT

A method for monitoring noise associated with a communication link is provided that includes monitoring a plurality of communication links that facilitate a plurality of communication flows and determining whether an error parameter associated with a selected one or more of the communication links has exceeded a predefined threshold. An alert message may then be communicated to a next destination when the predefined threshold has been exceeded.

22 Claims, 2 Drawing Sheets

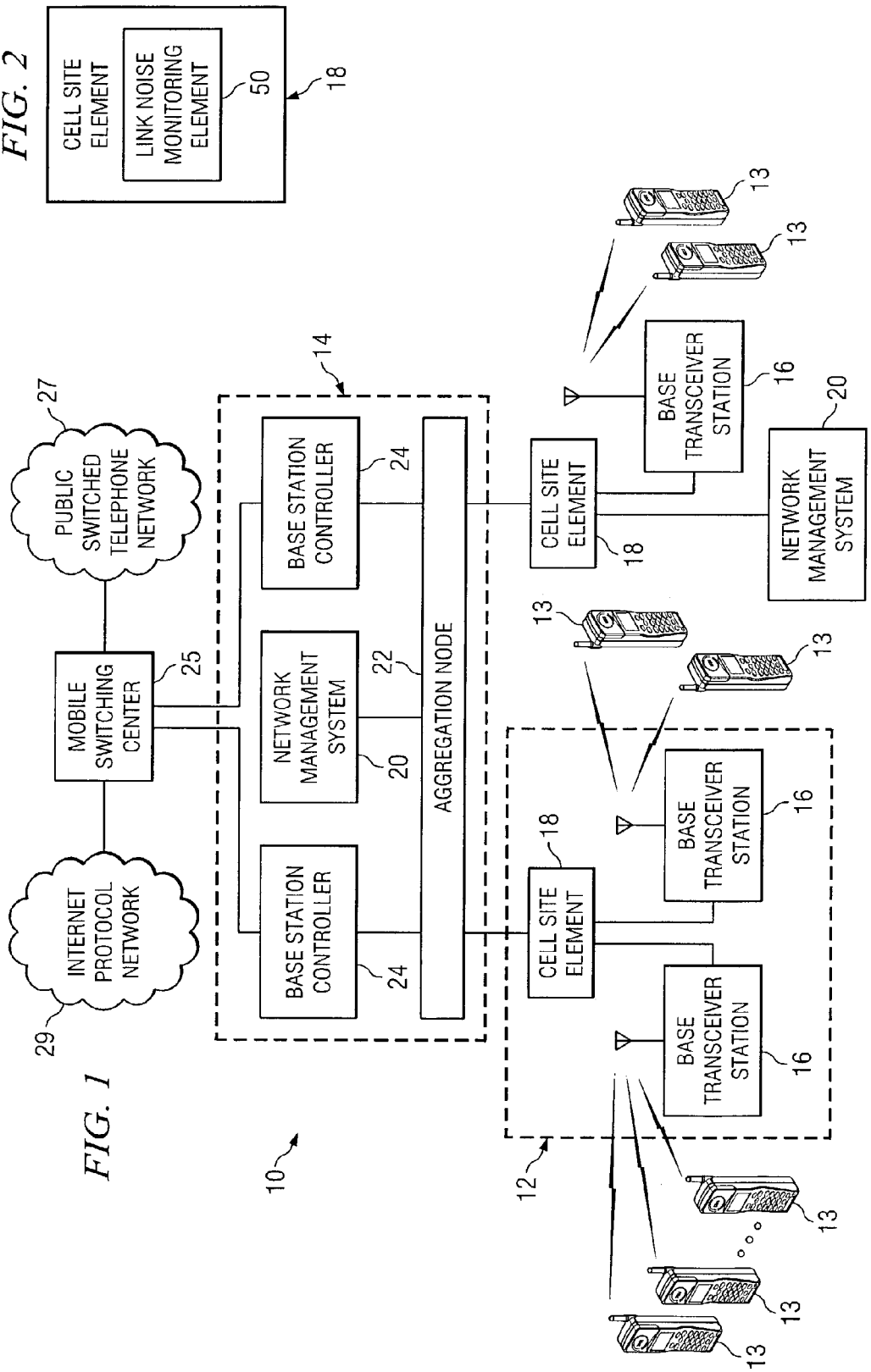

SYSTEM AND METHOD FOR MONITORING NOISE ASSOCIATED WITH A COMMUNICATION LINK

TECHNICAL FIELD OF THE INVENTION

This invention relates in general to the field of communication monitoring and more particularly to a system and method for monitoring noise associated with a communication link.

BACKGROUND OF THE INVENTION

Communication systems have grown increasingly complex in today's society. One aspect associated with communications relates to noise condition monitoring. High levels of noise may result in traffic loss or significant degradation in the quality of data such that the resulting/surviving data is unusable. For example, in video or voice applications, noise may cause video data to be unviewable or voice data to be inaudible. Additionally, data traffic that experiences significant noise conditions may require retries, which can expend valuable network resources. In scenarios where traffic is distributed across multiple links, a myriad of additional configuration problems associated with noise may occur.

A number of approaches currently exist to address communication links that are associated with inadequate noise characteristics. However, these approaches suffer from many limitations such as the inability to accurately and properly remove and/or replace communication links for example. Additionally, such techniques reflect poor efficacy in being unable to provide an effective monitoring approach for problematic links. Such deficiencies may inhibit system performance and force valuable bandwidth to be underutilized or wasted. Furthermore, such approaches may be restrictive in that they are incapable of managing links as a group or adjusting tolerances based on particular needs.

SUMMARY OF THE INVENTION

From the foregoing, it may be appreciated by those skilled in the art that a need has arisen for an improved communications approach that provides the capability for effective monitoring of noise or errors associated with one or more communication links. In accordance with one embodiment of the present invention, a system and a method for monitoring communication links are provided that substantially eliminate or greatly reduce disadvantages and problems associated with conventional communication monitoring techniques.

According to one embodiment of the present invention, there is provided a method for monitoring a communication link that includes monitoring a plurality of communication links that facilitate a plurality of communication flows and determining whether an error parameter associated with a selected one or more of the communication links has exceeded a predefined threshold. An alert message may then be communicated to a next destination when the predefined threshold has been exceeded.

Certain embodiments of the present invention may provide a number of technical advantages. For example, according to one embodiment of the present invention, a communications approach is provided that allows multiple communication links to be monitored as a group, rather than as separate entities. The architecture provided by the present system may further provide the ability to customize tolerable loss (due to noise) based on a particular network environment or a designated system parameter. For example, real-time voice data may be adversely affected by noise at lower thresholds than data traffic. Each of these thresholds may be accommodated by the architecture of the present invention, which offers enhanced flexibility to an end user or system operator in configuring any number of parameters that direct or control the communication monitoring protocol.

Another technical advantage associated with one embodiment of the present invention relates to adaptability. This may be the result of a link noise monitoring approach that is capable of alerting a network operator of noisy links that may need attention. Such alerts may be manipulated, based on particular needs, in order to provide multiple signals for various system conditions in the corresponding architecture. Additionally, such alerts or messages may be used to notify network application layer service providers to adjust bandwidth allocations based on links being removed or added. Network operators may respond to such alerts or messages by either removing or replacing links, or by changing other network parameters in order to address the problem. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 1 is a simplified block diagram of a communication system for monitoring a plurality of communication links in accordance with one embodiment of the present invention;

FIG. 2 is a simplified block diagram of a cell site element included within the communication system.

DETAILED DESCRIPTION OF THE INVENTION

Figure 3:
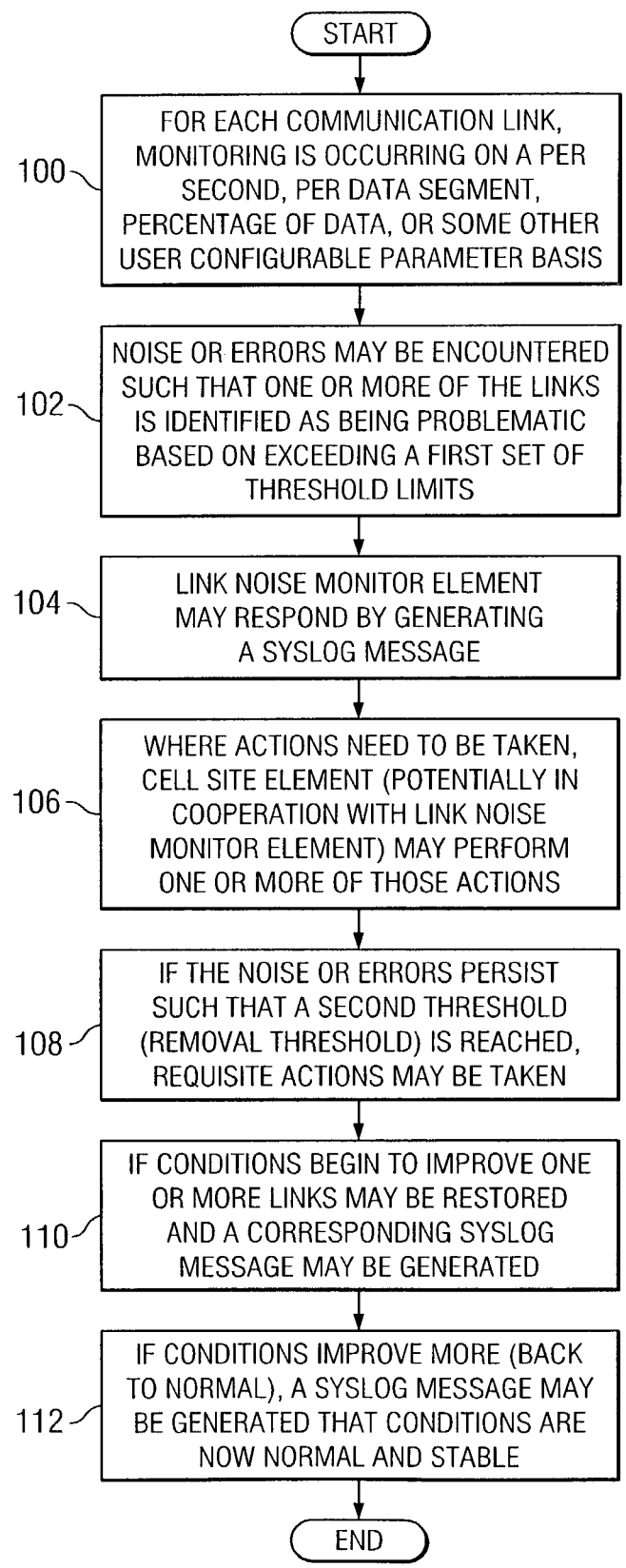
FIG. 3 is a flowchart illustrating a series of example steps associated with a method for monitoring a communication link in the communication system.

FIG. 1 is a simplified block diagram of a communication system 10 for monitoring one or more communication links in accordance with one embodiment of the present invention. Communication system 10 may include a plurality of cell sites 12, a plurality of mobile stations 13, a central office site 14, a plurality of base transceiver stations 16, a plurality of cell site elements 18, and a network management system 20. Additionally, communication system 10 may include an aggregation node 22, a plurality of base station controllers 24, a mobile switching center 25, a public switched telephone network (PSTN) 27, and an internet protocol (IP) network 29.

Communication system 10 may generally be configured or arranged to represent a 2.5 G architecture applicable to a Global System for Mobile (GSM) environment in accordance with a particular embodiment of the present invention. However, the 2.5 G architecture is offered for purposes of example only and may alternatively be substituted with any suitable networking system or arrangement that provides a communicative platform for communication system 10. For example, the present invention may be used in conjunction with a first generation or 3 G network, where first generation or 3 G equivalent networking equipment is provided in the architecture. Communication system 10 is versatile in that it may be used in a host of communication environments such as in conjunction with any time division multiple access (TDMA) element or protocol for example, whereby signals from end users, subscriber units, or mobile stations 13 may be multiplexed over the time domain.

In accordance with the teachings of the present invention, communication system 10 operates to monitor a group of links that may distribute traffic as a collective entity. Communication system 10 may further provide an alert signal to a suitable next destination (e.g. a network manager or system administrator) when configurable tolerances of noise occur or subside on a given link that is being monitored. Communication system 10 may further provide an alert message to a network manager or system operator that warns of the error condition. The network manager or system administrator may respond to the alert message by simply noting the condition, or by removing or restoring one or more noisy links from/to traffic scheduling when configurable tolerances of noise occur/subside. In order to make such traffic management determinations, communication system 10 may use current traffic utilization characteristics associated with the links and/or activity parameters associated with the links in order to assist in making link removal, restoration, or modification decisions.

In cases where only a single link associated with a data exchange remains, communication system 10 may allow the final link to be left operational, as there is generally little value in removing the last link (regardless of noise level). Notifications of link additions/removals may be directed to application nodes that may then adjust the total application throughput (i.e. reduce the allowed number of voice, video, or data calls, redistribute information to other web servers or other links to handle transactions, etc.) across the network.

Mobile station 13 is an entity, such as a client, subscriber, end user, or customer that seeks to initiate a communication session or data exchange in communication system 10 via any suitable network. Mobile station 13 may operate to use any suitable device for communications in communication system 10. Mobile station 13 may further represent a communications interface for an end user of communication system 10. Mobile station 13 may be a cellular or other wireless telephone, an electronic notebook, a computer, a personal digital assistant (PDA), or any other device, component, or object capable of initiating a data exchange facilitated by communication system 10. Mobile station 13 may also be inclusive of any suitable interface to the human user or to a computer, such as a display, microphone, keyboard, or other terminal equipment (such as for example an interface to a personal computer or to a facsimile machine in cases where mobile station 13 is used as a modem). Mobile station 13 may alternatively be any device or object that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

Base transceiver stations 16 are communicative interfaces that may comprise radio transmission/reception devices, components, or objects, and antennas. Base transceiver stations 16 may be coupled to any communications device or element, such as mobile station 13 for example. Base transceiver stations 16 may also be coupled to base station controllers 24 (via one or more intermediate elements) that use a landline (such as a T1/E1 line, for example) interface. Base transceiver stations 16 may operate as a series of complex radio modems where appropriate. Base transceiver stations 16 may also perform transcoding and rate adaptation functions in accordance with particular needs. Transcoding and rate adaptation may also be executed in a GSM environment in suitable hardware or software (for example in a transcoding and rate adaptation unit (TRAU)) positioned between mobile switching center 25 and base station controllers 24.

In operation, communication system 10 may include multiple cell sites 12 that communicate with mobile stations 13 using base transceiver stations 16 and cell site element 18. Central office site 14 may use aggregation node 22 and base station controllers 24 for communicating with cell site 12. One or more network management systems 20 may be coupled to either cell site 12 and central office site 14 (or both as desired), whereby mobile switching center 25 provides an interface between base station controllers 24 (of central office site 14) and PSTN 27, IP network 29, and/or any other suitable communication network. Base transceiver stations 16 may be coupled to cell site element 18 by a T1/E1 line or any other suitable communication link or element operable to facilitate data exchanges. As used herein in this document, 'link' refers to any communication wire, cable, fiber, line, conduit, passage, or pathway operable to carry or communicate information or data in any appropriate format. A backhaul connection between cell site element 18 and aggregation node 22 may also include a suitable communication link (e.g. T1/E1 line).

Base station controllers 24 generally operate as management components for a radio interface. This may be done through remote commands to a corresponding base transceiver station (e.g. base transceiver station 16) within a mobile network. One base station controller 24 may manage more than one base transceiver station 16. Some of the responsibilities of base station controllers 24 may include management of radio channels and assisting in handover scenarios.

In operation, layer two based traffic may be communicated by each base transceiver station 16 to cell site element 18 of cell site 12. Cell site element 18 may also receive IP or Ethernet traffic from network management system 20. Cell site element 18 may multiplex payloads together from the layer two based traffic that have a common destination. The multiplexed payloads as well as any payloads extracted from the network management system (e.g. IP or Ethernet traffic) may be communicated across a link to aggregation node 22 within central office site 14. Aggregation node 22 may demultiplex the payloads for delivery to an appropriate base station controller 24 or network management system 20.

Mobile switching center 25 operates as an interface between PSTN 27 and base station controllers 24, and potentially between multiple other mobile switching centers in a network and base station controller 24. Mobile switching center 25 represents a location that generally houses communication switches and computers and ensures that its cell sites in a given geographical area are properly connected. Cell sites refer generally to the transmission and reception equipment or components that connect elements such as mobile station 13 to a network, such as IP network 29 for example. By controlling transmission power and radio frequencies, mobile switching center 25 may monitor the movement and the transfer of a wireless communication from one cell to another cell and from one frequency or channel to another frequency or channel. In a given communication environment, communication system 10 may include multiple mobile switching centers 25 that are operable to facilitate communications between base station controllers 24 and PSTN 27. Mobile switching center 25 may also generally handle connection, tracking, status, billing information, and other user information for communications in a designated area where appropriate.

PSTN 27 represents a worldwide telephone system that is operable to conduct or facilitate communications. PSTN 27 may be any land line telephone network operable to facilitate communications between two entities, such as two persons, a person and a computer, two computers, or in any other environment in which data is exchanged for purposes of communication. According to one embodiment of the present invention, PSTN 27 operates in a wireless domain, facilitating data exchanges between mobile station 13 and any other suitable entity within or external to communication system 10.

IP network 29 is a series of points or nodes of interconnected communication paths for receiving and transmitting packets of information that propagate through communication system 10. IP network 29 offers a communications interface between mobile stations 13 and any other suitable network equipment. IP network 29 may be any local area network (LAN), metropolitan area network (MAN), wide area network (WAN), wireless local area network (WLAN), virtual private network (VPN), or any other appropriate architecture or system that facilitates communications in a network environment. IP network 29 implements a transmission control protocol/internet protocol (TCP/IP) communication language protocol in a particular embodiment of the present invention. However, IP network 29 may alternatively implement any other suitable communications protocol (e.g. frame relay, X.25, asynchronous transfer mode (ATM), etc.) for transmitting and receiving data packets within communication system 10.

Aggregation node 22 and cell site element 18 are network elements that may share one or more of the same functionalities and/or capabilities. For purposes of example and teaching only, the link noise monitoring feature is described as being positioned in cell site element 18. Alternatively, such a capability may be provided in any other suitable location of communication system 10 or provided separately as its own distinct structure, device, component, module, element or object. It is also critical to note that the use of the terms 'aggregation node' and 'cell site element' herein in this document only connotes an example representation of one or more elements associated with base transceiver station 16 and base station controller 24. These terms have been chosen arbitrarily and offered for purposes of teaching only and do not necessarily imply any particular architecture or configuration. Moreover, the terms 'cell site element' and 'aggregation node' are intended to encompass any network element operable to facilitate a data exchange in a network environment. Accordingly, cell site element 18 and aggregation node 22 may be routers, switches, bridges, gateways, loadbalancers, interfaces, or any other suitable module, device, component, element or object operable to effectuate one or more of the operations, tasks, or functionalities associated with monitoring noise data as implied, described, provided, or offered herein.

Cell site element 18 may monitor an element (e.g. a controller chip) that controls the T1 link. Cell site element 18 may monitor various errors being reported there and, in a particular embodiment, monitor line code violations, path code violations, bi-polar violations, or excessive zeros that occur. Alternatively, cell site element 18 may monitor any other suitable errors or noise parameters in accordance with particular needs. When the communication link becomes noisy, a warning signal may be communicated to an administrator or a network operator such that he is made aware of the possible deterioration in quality of data. The alert signal may also be communicated to an administration module (that may be provided in any suitable location within communication system 10) that reports or consolidates such information to be reviewed by an administrator, network operator, or any other suitable entity. Considerable flexibility is provided to an end user or network administrator in configuring any number of parameters that result in a notification or removal operation being implemented. For example, a network administrator may configure a given time interval where the number of errors is being detected. Additionally, a network administrator or system operator may decide to set a parameter based on a percentage of information or data being received. Considerable versatility and flexibility is granted by the architecture of the present invention in that any noise criteria (e.g. noise data associated with time, percentage error, error number, throughput, etc.) may be implemented by communication system 10.

At cell site element 18, a SYSLOG alert message may be generated that indicates a particular severity in noise or error associated with a communication link. The SYSLOG message (via a configuration command) may be converted into an appropriate signal to be sent via a simple network management protocol (SNMP) to a suitable application that may consolidate monitoring functions of a network. Alternatively, this signal or message may be sent to any suitable entity, module, element, or object operable to authorize or otherwise control managerial functions or administration parameters associated with a network or a communication link. A corresponding element may, in turn, filter elements (as it may be configured to do) or pass the alert up to a higher level of management. Additionally, the alert signal or message may trigger a suitable protocol for networking equipment or gear to execute some action based on the signal. Such alerts or messages may be passed on to suitable maintenance, control, and fault mechanisms that identify and process the signal such that the error condition or noise parameter may be addressed. The SYSLOG message may also flag the logging of error messages to a console or controller. The protocol may be applicable to any type of layer one medium that allows for the gathering or reporting of physical layer statistics associated with error conditions or noise. For cyclic redundancy check (CRC) errors, a path code violation counter may be incremented. One or more counters may be provided to cell site element 18 in order to achieve this operation.

It is important to note that the SYSLOG message is a suitable logging message that may be used in connection with signaling or identifying error conditions. Alternatively, the SYSLOG message may be replaced with any other suitable communicative element that effectuates the intended functionality of the SYSLOG message. Additionally, it should be noted that use of the terms 'alert' 'signal' and 'message' (or any combinations thereof) may be used interchangeably in certain instances. These terms reflect the concept of providing a communication that identifies some condition or warning within communication system 10.

In operation of an example embodiment, a method for detecting errors may be effectuated at the physical layer of each network interface. This can be achieved by monitoring the bit errors rates and network CRC errors. Communication system 10 provides considerable flexibility in that noise tolerance levels can be configured based on any number of parameters, such as layer one error threshold including a number of errors per sample period, sample period, number of samples, or percent of errored samples for example.

A periodic timer included within cell site element 18 (or provided at any other suitable location) may monitor the physical layer according to the current settings or designations associated with error tolerances and initiate the appropriate action when tolerances are exceeded (e.g. cause alerts, notify a higher layer of actions that were [or that should be] taken, etc.). A higher layer timer monitor element may also be provided within cell site element 18 (or in any other appropriate location) to monitor the number of links and network utilization, and to adjust the tolerances of the links, as needed, based on current system conditions or particular networking needs.

Such a configuration allows noise associated with multiple network links to be managed collectively as a group, rather than as separate entities. The architecture of communication system 10 may further allow tolerable loss to be designated or otherwise selected based on the particular customer's network environment, system performance characteristics, or particular data transmission needs. For example, the integrity of real-time voice data requires more sensitive (i.e. lower threshold) system configuration as compared to higher thresholds associated with simple data traffic.

FIG. 2 is a simplified block diagram of cell site element 18 included within communication system 10. Cell site element 18 may include a link noise monitoring element 50, in accordance with one embodiment of the present invention, that implements one or more noise monitoring tasks as described herein. Link noise monitoring element 50 may include any suitable hardware, software, algorithms, objects, or elements operable to facilitate the functionality or operations thereof.

Link noise monitoring element 50 may monitor the link quality of individual links within a multilink bundle. Link noise monitoring element 50 may provide the ability to issue a warning or an alert on reaching a certain level of noise, and further remove the link based on a second level of noise. Conversely, once the level of noise improves to a certain level of quality, the link may be restored to service, which may be accompanied by an indication of improved communication quality to be communicated to any appropriate source or location.

In an example embodiment, link noise monitoring element 50 may include two monitoring aspects. The first is a link warning element that may include a monitor that provides the capability to issue a warning when the link surpasses a configured level of noise. A notification may then be given when the link noise level improves to a second configured level of noise. The second is a link removal element that may include a monitor that provides the capability to remove a link from service in the bundle and, further, to issue an error when the link surpasses a configured level of noise. The link may be restored and a warning issued when the link noise level improves below a second configured level of noise. Both warning and removal types of monitors may include two thresholds and/or durations. The first threshold and duration may operate to cause the error condition. The second threshold and duration may operate to clear the error condition.

When only one active link remains in the multilink bundle, an attempt may be made to maintain this link in service by issuing an alert rather than removing the link from service when the link removal level of noise is reached. The warning monitor may remain active during such a period. The T1 standard error rate may be in effect, where appropriate, in order to remove the final link from service. Even in egregious noise condition scenarios, it is generally better to maintain at least one communication link than no communication links at all.

In general, the T1 standard may operate to remove noisy T1 spans from service when the Bit Error Ratio (BER) exceeds $10^{-3}$ for more than 10 consecutive seconds. For a T1 interface, this may equate to 1.544 mega-bits per second (Mbps) T1*$10^{-3}$ BER=1544 errors per second. Such a BER may be further reflected by Line Code Violation (LCV) or Path Code Violation (PCV) errors. An LCV is an occurrence of either a Bi-Polar Violation (BPV) or an Excessive Zeroes (EXZ) Error. For T1 controllers, the BER may be considered above $10^{-3}$ if either PCV>320 errors per second or LCV>1544 errors per second. Additionally, link noise monitoring element 50 may implement or involve any other suitable violation or error condition or characteristic.

Communication system 10 may use the LCV as the threshold parameter that an end user or pilot may configure. The appropriate PCV value may then be determined by PCV=LCV*320/1544 errors per second. Such a design may compare LCV and PCV errors against the user configured LCV and the calculated PCV values each second. When the number of either LCV or PCV errors is above (below) the threshold during a second, it is an error (clear) second. If consecutive error (clear) seconds persist for the user configured duration, the errored event may occur (clear).

Two command line options may be included within link noise monitoring element 50, one for link warning and one for link removal operations. These options may be specified on each T1 controller in the bundle that is targeted for monitoring. These two options may also be configured independently of each other where appropriate. Either or both may be used in a configuration in accordance with particular needs. Each option may be entered in two forms: the error condition and the clear condition.

Both the warning and the removal conditions may cause a SYSLOG message to be generated upon the threshold being exceeded for the sample duration. In addition, SYSLOG messages may be generated when their clear thresholds are reached for the clear sample duration. For the removal/restore conditions, if it is the last link in a multilink bundle, different remove messages and severities may be presented in order to indicate the thresholds were surpassed, but no removal/restore occurred. Once a warn or remove noise level has been exceeded, and the associated SYSLOG generated, the SYSLOG message may not occur again until its corresponding clear level has been reached and the clear SYSLOG message is issued. The SYSLOG messages may be prepended with a timestamp provided by any suitable protocol such as an input output supervision (IOS) protocol for example.

FIG. 3 is a simplified flowchart illustrating a series of example steps associated with a method for monitoring a communication link in accordance with one embodiment of the present invention. General or routine traffic flow may be occurring in communication system 10 such that a multi-link T1 bundle is present and all four (or more or less depending on particular needs) lines may be free of noise and errors. The method may begin at step 100, where for each communication link, monitoring is occurring on a per second, per data segment, percentage of data, or some other user configurable parameter basis. During each second, error counts may be monitored. The user configurable parameters may provide enhanced flexibility for link flapping scenarios. Such scenarios may occur where noise or errors bounce between a value such that SYSLOG messages are continually generated. The flexibility provided by communication system 10 avoids this problem. A user or network administrator may configure any noise or error parameters based on particular needs and obviate this link flapping issue.

In the example embodiment, noise or errors may be encountered such that one of the lines is identified as being problematic at step 102. This may be the result of one or more thresholds that are crossed or exceeded. Thresholds are configurable, whereby a time default may be provided as ten seconds. Accordingly, for an example period of ten seconds, error values may exceed the threshold levels and link noise monitor element 50 may respond by generating a SYSLOG message at step 104.

If any actions need to be taken, cell site element 18 may perform one or more of those actions at step 106 in response to the threshold limits being exceeded or crossed. At step 108, if the noise or errors persist such that a second threshold (removal threshold) is reached, requisite removal procedures may be taken. For example, in cases where parameters have not been designated or specified and the default values are exceeded, particular links may be removed from the bundle. However, if the link being identified is the last link in the bundle, the link may not be removed. A SYSLOG error may be generated instead to indicate that a single problematic link remains in the architecture.

In the example provided, conditions begin to improve. Accordingly, at step 110 one or more links may be restored and a corresponding SYSLOG message may be generated. When conditions improve even more (back to normal), a SYSLOG message may be generated that conditions are now normal and stable at step 112. Normal traffic patterns may now resume and the monitoring process may continue. Some of the steps illustrated in FIG. 3 may be changed or deleted where appropriate and additional steps may also be added to the flowchart. These changes may be based on specific communication system architectures or particular networking arrangements or configurations and do not depart from the scope or the teachings of the present invention.

Although the present invention has been described in detail with reference to particular embodiments illustrated in FIGS. 1 through 3, it should be understood that various other changes, substitutions, and alterations may be made hereto without departing from the spirit and scope of the present invention. For example, although the present invention has been described with reference to a number of elements included within communication system 10, these elements may be rearranged or positioned in order to accommodate any suitable routing architectures. In addition, any of these elements may be provided as separate external components to communication system 10 or to each other where appropriate. The present invention contemplates great flexibility in the arrangement of these elements as well as their internal elements.

In addition, although the preceding description offers a monitoring protocol to be implemented with particular devices (e.g. aggregation node 22 or cell site element 18), the monitoring protocol provided may be embodied in a fabricated module that is designed specifically for effectuating the monitoring techniques as provided above. Moreover, such a module may be compatible with any appropriate protocol and communication links other than T1/E1 links, which were offered for purposes of teaching and example only.

Additionally, although some example embodiments provided above may reference voice data, communication system 10 may cooperate with any other type of data in which monitoring protocols are applicable. For example, normative or standard data, video data, and audio-visual data may benefit from the teachings of the present invention. Communication system 10 is adaptable in that it may be used in conjunction with any information that is sought to be compressed in a communications environment.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus for monitoring noise associated with a communication link, comprising:

a cell site element facilitating a data exchange, wherein the cell site element includes a link noise monitoring element monitoring a plurality of communication links that facilitate a plurality of communication flows and to determine whether an error parameter associated with a selected one or more of the communication links has exceeded a predefined threshold, the link noise monitoring element communicates an alert message to a next destination when the predefined threshold has been exceeded, wherein the link noise monitoring element monitors one or more of the plurality of communication links in order to determine if an additional predefined threshold has been exceeded, the additional predefined threshold being associated with a removal protocol, and wherein if the additional predefined threshold is exceeded, the link noise monitoring element responds by removing one or more of the communication links associated with exceeding the additional predefined threshold, wherein if a communication link associated with the removal protocol is a last link in a multi-link bundle, it is not removed.

2. The apparatus of claim 1, wherein the error parameter is a selected one of a group of parameters consisting of:

a time interval associated with a selected one or more of the communication links;

an amount of errors associated with a selected one or more of the communication links;

a percentage of errors associated with a selected one or more of the communication links; and a number of errors associated with a selected one or more of the communication links.

3. The apparatus of claim 1, further comprising:

an administration module receiving the alert message and to respond by executing one or more actions that address an error condition.

4. The apparatus of claim 1, wherein the link noise monitoring element generates a logging message as a result of the predefined threshold being exceeded, the logging message being communicated to the next destination.

5. The apparatus of claim 1, wherein the link noise monitoring element restores a selected one of the plurality of links when error conditions improve, the link noise monitoring element generating a message to be communicated to the next destination that indicates that the selected link has been restored.

6. The apparatus of claim 1, wherein the link noise monitoring element detects when one or more error conditions subside and return to a stable traffic pattern, and wherein the link noise monitoring element generates a message to be communicated to the next destination that indicates a stability condition associated with the stable traffic pattern.

7. An apparatus for monitoring noise associated with a communication aggregation node link, comprising:

an aggregation node facilitating a data exchange, wherein the aggregation node includes a link noise monitoring element monitoring a plurality of communication links that facilitate a plurality of communication flows and to determine whether an error parameter associated with a selected one or more of the communication links has exceeded a predefined threshold, the link noise monitoring element communicating an alert message to a next destination when the predefined threshold has been exceeded, wherein the link noise monitoring element monitors one or more of the plurality of communication links in order to determine if an additional predefined threshold has been exceeded, the additional predefined threshold being associated with a removal protocol, and wherein if the additional predefined threshold is exceeded, the link noise monitoring element responds by removing one or more of the communication links associated with exceeding the additional predefined threshold, wherein if a communication link associated with the removal protocol is a last link in a multi-link bundle, it is not removed.

8. The apparatus of claim 7, wherein the error parameter is a selected one of a group of parameters consisting of:
 a time interval associated with a selected one or more of the communication links;
 an amount of error associated with a selected one or more of the communication links;
 a percentage of error associated with a selected one or more of the communication links; and
 a number of errors associated with a selected one or more of the communication links.

9. The apparatus of claim 7, wherein the link noise monitoring element generates a logging message as a result of the predefined threshold being exceeded, the logging message being communicated to the next destination.

10. A method for monitoring noise associated with a communication link, comprising:
 monitoring a plurality of communication links that facilitate a plurality of communication flows;
 determining whether an error parameter associated with a selected one or more of the communication links has exceeded a predefined threshold; and
 communicating an alert message to a next destination when the predefined threshold has been exceeded, wherein the link noise monitoring element monitors one or more of the plurality of communication links in order to determine if an additional predefined threshold has been exceeded, the additional predefined threshold being associated with a removal protocol, and wherein if the additional predefined threshold is exceeded, the link noise monitoring element responds by removing one or more of the communication links associated with exceeding the additional predefined threshold, wherein if a communication link associated with the removal protocol is a last link in a multi-link bundle, it is not removed.

11. The method of claim 10, further comprising:
 receiving the alert message; and
 responding to the alert message by executing one or more actions that address an error condition associated with exceeding the predefined threshold.

12. The method of claim 10, further comprising:
 generating a SYSLOG message as a result of the predefined threshold being exceeded, the SYSLOG message being communicated to the next destination.

13. The method of claim 10, further comprising:
 restoring a selected one of the plurality of links when error conditions improve; and
 generating a message to be communicated to the next destination that indicates that the selected link has been restored.

14. A system for monitoring noise associated with a communication link, comprising:
 means for monitoring a plurality of communication links that facilitate a plurality of communication flows;
 means for determining whether an error parameter associated with a selected one or more of the communication links has exceeded a predefined threshold; and
 means for communicating an alert message to a next destination when the predefined threshold has been exceeded, wherein the link noise monitoring element monitors one or more of the plurality of communication links in order to determine if an additional predefined threshold has been exceeded, the additional predefined threshold being associated with a removal protocol, and wherein if the additional predefined threshold is exceeded, the link noise monitoring element responds by removing one or more of the communication links associated with exceeding the additional predefined threshold, wherein if a communication link associated with the removal protocol is a last link in a multi-link bundle, it is not removed.

15. The system of claim 14, further comprising:
 means for receiving the alert message; and
 means for responding to the alert message by executing one or more actions that address an error condition associated with exceeding the predefined threshold.

16. The system of claim 14, further comprising:
 means for generating a logging message as a result of the predefined threshold being exceeded, the logging message being communicated to the next destination.

17. The system of claim 14, further comprising:
 means for restoring a selected one of the plurality of links when error conditions improve; and
 means for generating a message to be communicated to the next destination that indicates that the selected link has been restored.

18. Software embodied in a computer readable medium, the medium comprising code such that when executed is operable to:
 monitor a plurality of communication links that facilitate a plurality of communication flows;
 determine whether an error parameter associated with a selected one or more of the communication links has exceeded a predefined threshold; and
 communicate an alert message to a next destination when the predefined threshold has been exceeded, wherein the link noise monitoring element monitors one or more of the plurality of communication links in order to determine if an additional predefined threshold has been exceeded, the additional predefined threshold being associated with a removal protocol, and wherein if the additional predefined threshold is exceeded, the link noise monitoring element responds by removing one or more of the communication links associated with exceeding the additional predefined threshold, wherein if a communication link associated with the removal protocol is a last link in a multi-link bundle, it is not removed.

19. The software of claim 18, wherein the code is further operable to:
 receive the alert message; and
 respond to the alert message by executing one or more actions that address an error condition associated with exceeding the predefined threshold.

20. The software of claim 18, wherein the code is further operable to:
 generate a logging message as a result of the predefined threshold being exceeded, the logging message being communicated to the next destination.

21. The software of claim 18, wherein the code is further operable to:
- restore a selected one of the plurality of links when error conditions improve; and
- generate a message to be communicated to the next destination that indicates that the selected link has been restored.

22. An apparatus for monitoring noise associated with a communication link, comprising:
- a cell site element operable to facilitating a data exchange, wherein the cell site element includes a link noise monitoring element that monitors a plurality of communication links that facilitate a plurality of communication flows and to determine whether an error parameter associated with a selected one or more of the communication links has exceeded a predefined threshold, the link noise monitoring element communicating an alert message to a next destination when the predefined threshold has been exceeded; and
- an administration module receiving the alert message and to respond by executing one or more actions that address an error condition, the link noise monitoring element generating a logging message as a result of the predefined threshold being exceeded, the logging message being communicated to the next destination, wherein the link noise monitoring element monitoring one or more of the plurality of communication links in order to determine if an additional predefined threshold has been exceeded, the additional predefined threshold being associated with a removal protocol, and wherein if the additional predefined threshold is exceeded, the link noise monitoring element responds by removing one or more of the communication links associated with exceeding the additional predefined threshold, wherein if a communication link associated with the removal protocol is a last link in a multi-link bundle, it is not removed.

* * * * *